(12) United States Patent
Kim (10) Patent No.: US 11,345,413 B2
(45) Date of Patent: May 31, 2022

(54) SIDE RIGIDITY REINFORCEMENT STRUCTURE OF VEHICLE

(71) Applicants: HYUNDAI MOTOR COMPANY, Seoul (KR); KIA MOTORS CORPORATION, Seoul (KR)

(72) Inventor: Sung-Won Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/037,009

(22) Filed: Sep. 29, 2020

(65) Prior Publication Data
US 2021/0380173 A1    Dec. 9, 2021

(30) Foreign Application Priority Data

Jun. 9, 2020  (KR) .................. 10-2020-0069646

(51) Int. Cl.
| | | |
|---|---|---|
| *B62D 27/02* | (2006.01) | |
| *B62D 25/02* | (2006.01) | |
| *B62D 21/15* | (2006.01) | |
| *B62D 25/20* | (2006.01) | |

(52) U.S. Cl.
CPC ......... *B62D 27/023* (2013.01); *B62D 21/157* (2013.01); *B62D 25/025* (2013.01); *B62D 25/2036* (2013.01)

(58) Field of Classification Search
CPC .. B62D 25/025; B62D 25/2036; B62D 25/20; B62D 25/2009; B62D 27/023; B62D 21/15; B62D 21/157
USPC .......... 296/209, 203.01, 203.03, 204, 187.12
See application file for complete search history.

(56) References Cited

FOREIGN PATENT DOCUMENTS

| JP | 2010036810 A | * | 2/2010 |
| JP | 2011218944 A | * | 11/2011 |
| KR | 10-2015-0137327 A | | 12/2015 |

\* cited by examiner

*Primary Examiner* — Dennis H Pedder
(74) *Attorney, Agent, or Firm* — Lempia Summerfield Katz LLC (57) ABSTRACT

A side rigidity reinforcement structure of a vehicle includes: a side sill which is extended in a front and rear direction of the vehicle and includes a side sill inner reinforcement and a side sill outer reinforcement; a first center floor cross member disposed in a width direction of the vehicle and bonded to a center floor panel; and a side arch reinforcement formed to be convex upward and having a center portion spaced apart from the center floor panel. In particular, the side arch reinforcement includes: a first end penetrating the side sill inner reinforcement so to be bonded on an inner lower surface of the side sill outer reinforcement while supporting the side sill inner reinforcement, and a second end connected to the first center floor cross member to transfer a shock force input from the side sill outer reinforcement to the first center floor cross member.

12 Claims, 12 Drawing Sheets

SIDE RIGIDITY REINFORCEMENT STRUCTURE OF VEHICLE

CROSS-REFERENCE TO RELATED APPLICATION

This application claims priority to and the benefit of Korean Patent Application No. 10-2020-0069646, filed on Jun. 9, 2020, the entire contents of which are incorporated herein by reference.

FIELD

The present disclosure relates to a side rigidity reinforcement structure of a vehicle which reduces deformation caused by side collision so that a passenger's injury is reduced.

BACKGROUND

The statements in this section merely provide background information related to the present disclosure and may not constitute prior art.

Figure 1:
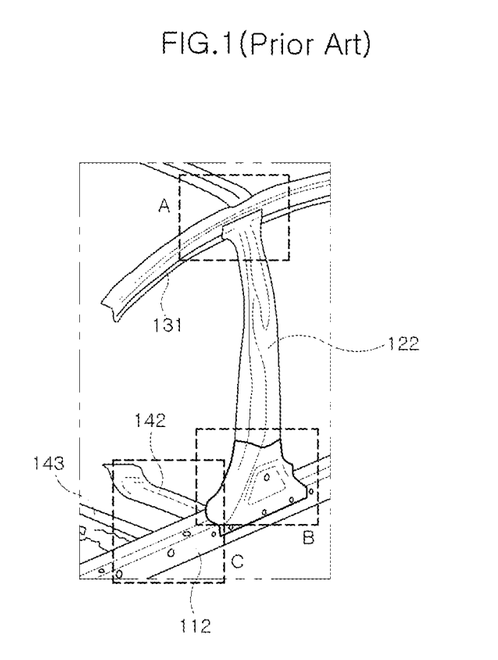
FIG. 1 is a perspective diagram illustrating a side partial structure of a vehicle body according to the related art.

Referring to FIG. 1, a method for testing the rigidity against a shock force applied upon side collision of a vehicle body of a vehicle is performed by mainly hitting a center pillar 120 of the vehicle with a barrier B in a state where a dummy is boarded inside the vehicle, and then measuring shock applied to the vehicle and the dummy and deformation of the vehicle body.

Figure 2:
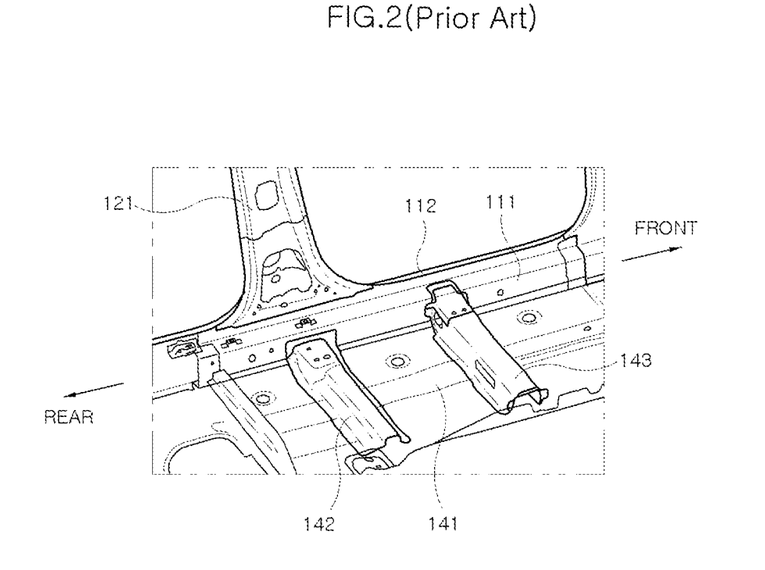
FIG. 2 is a perspective diagram illustrating a bonding portion between a side sill and a center floor cross member according to the related art.
Figure 5:
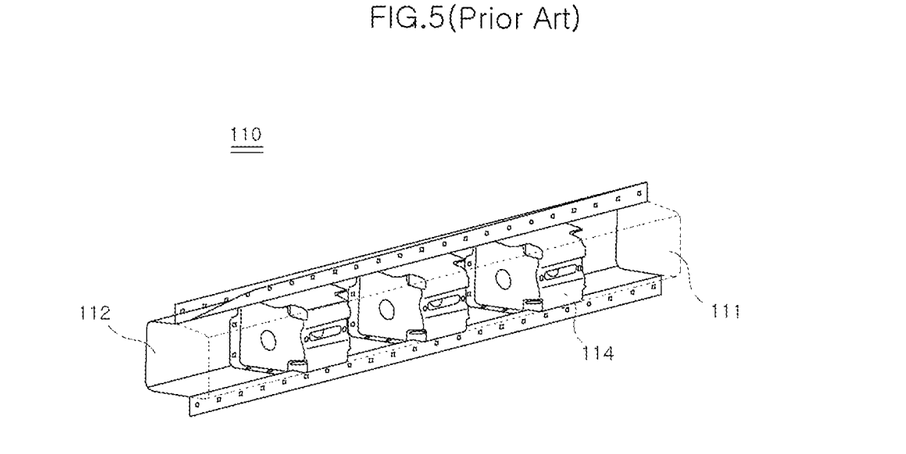
FIG. 5 is a perspective diagram illustrating a structure to which a bulkhead is applied to reinforce rigidity of the side sill according to the related art.

In the side structure of the vehicle, the center pillar 120 is bonded to a side sill 110 at the bottom and the top thereof as shown in FIGS. 2 and 5 is bonded to a roof side 131. In addition, both ends of a center floor panel 141 are each bonded to the side sill 110. In the center floor panel 141, center floor cross members 142, 143 are disposed in a width direction of the vehicle and have both ends each bonded to the side sill 110, and the center floor cross members 142, 143 are disposed to be space apart from each other at an interval in a front and rear direction of the vehicle.

Figure 3:
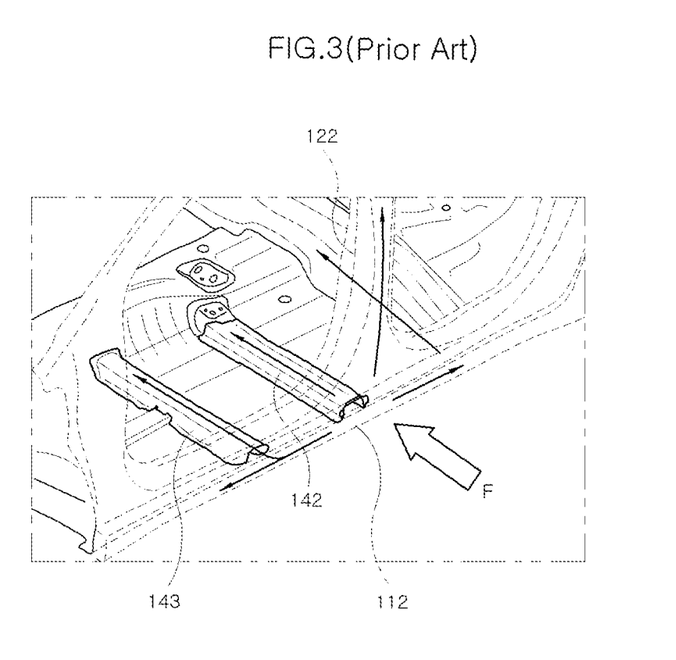
FIG. 3 is a perspective diagram illustrating a load path upon side collision according to the related art.

At this time, when the amount of shock is transferred to the side of the vehicle, as illustrated in FIG. 3, a shock force F is transferred through 'the side sill 110—the center floor cross members 142, 143' or 'the side sill 110—a center pillar 120' as a load path.

Figure 4:
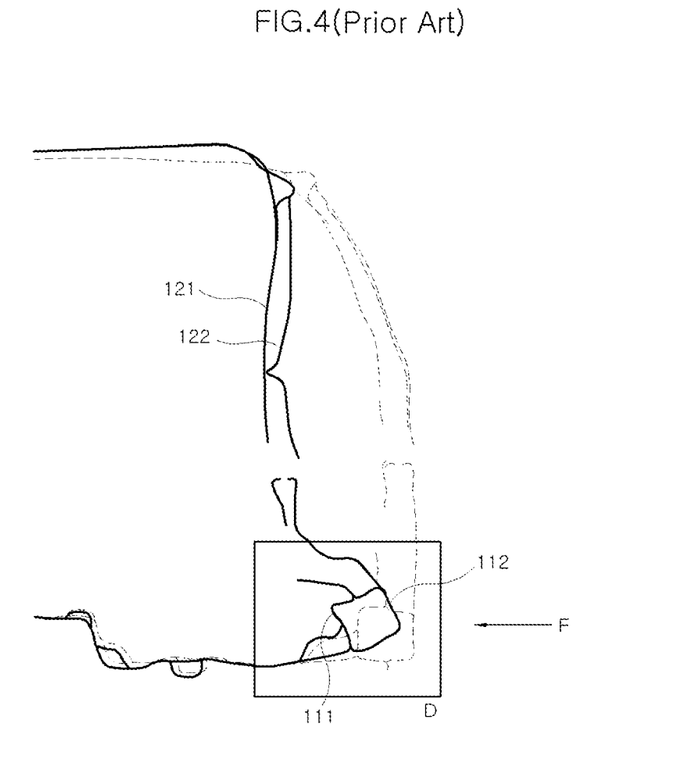
FIG. 4 is a cross-sectional diagram illustrating deformation of a center pillar and the side sill upon the side collision according to the related art.

Particularly, as illustrated in FIG. 4, a passenger's injury increases as a portion in which the lower portion of the center pillar 120 and the side sill 110 are in contact with each other enters into the vehicle by the shock force.

As a countermeasure for the above problem, a bulkhead 114 is inserted between a side sill inner reinforcement 111 and the side sill outer reinforcement 112 of the side sill 110, and thus deformation of the lower portion of the center pillar 120 and the side sill 110 is reduced upon side collision.

The barrier B hitting the side of the vehicle in the side collision test has different locations where the barrier B hits the side of the vehicle by country, and the deformed aspects of the center pillar 120 and the side sill 110 are changed according to the collision portion even upon the actual side collision accident. Accordingly, there is a problem in that the passenger's injury is severe depending on the portion to which the shock is applied.

SUMMARY

The present disclosure provides a side rigidity reinforcement structure of a vehicle, which may prevent a portion at which a center pillar and a side sill meet from entering into a vehicle so that a passenger's injury is reduced upon side collision.

Another object of the present disclosure is to provide a side rigidity reinforcement structure of a vehicle which allows a shock force input upon side collision to be dispersed and transferred.

In one form of the present disclosure, a side rigidity reinforcement structure of a vehicle includes: a side sill extended in a front and rear direction of the vehicle and including a side sill inner reinforcement and a side sill outer reinforcement which are bonded to each other; a first center floor cross member disposed in a width direction of the vehicle and bonded to an upper surface of a center floor panel; and a side arch reinforcement formed to be convex upward and including a center portion which is spaced apart from the center floor panel. In particular, the side arch reinforcement includes a first end connected to the side sill inner reinforcement, and a second end connected to the first center floor cross member to transfer a shock force input from the side sill outer reinforcement to the first center floor cross member.

The first end of the side arch reinforcement penetrates the side sill inner reinforcement and is fixedly bonded on an inner lower surface of the side sill outer reinforcement to support the side sill inner reinforcement.

The side sill inner reinforcement is formed with a first through hole through which the first end of the side arch reinforcement penetrates.

The side arch reinforcement is located at a portion of the side sill at which the side sill is connected to a center pillar.

The side rigidity reinforcement structure of the vehicle further includes: a center floor arch reinforcement in contact with the upper surface of the center floor panel. In one form, the center floor arch reinforcement includes: a first end bonded to the side sill outer reinforcement in front of a portion at which the side sill outer reinforcement and the side arch reinforcement are bonded to each other; a second end bonded to the side sill outer reinforcement behind the portion at which the side sill outer reinforcement and the side arch reinforcement are bonded to each other; and a center portion bonded to the side arch reinforcement and the first center floor cross member.

In another form, the side sill inner reinforcement is formed with front and rear second through holes through which the first and second ends of the center floor arch reinforcement respectively penetrates, and a portion of the side sill inner reinforcement at which the side arch reinforcement penetrates is arranged between the front second through hole and the rear second through hole.

The side arch reinforcement includes: a side arch upper reinforcement formed to be convex upward, having one end boned to an inner surface of the side sill outer reinforcement, and having the other end connected to the first center floor cross member; and a side arch lower reinforcement formed to be convex upward, and located below the side arch upper reinforcement to be bonded to the side arch upper reinforcement.

The side rigidity reinforcement structure of the vehicle further includes: a second center floor cross member disposed in front of the first center floor cross member in in the front and rear direction, wherein the second center floor cross member is bonded on the center floor panel, and connected to the center floor arch reinforcement.

In another form of the present disclosure, a side rigidity reinforcement structure of a vehicle includes: a side sill extended in a front and rear direction of the vehicle and including a side sill inner reinforcement and a side sill outer reinforcement which are bonded to each; a center floor panel located in the interior of the vehicle, and having a side end bonded to the side sill; a plurality of center floor cross members extended in a width direction of the vehicle, bonded to an upper surface of the center floor panel, and arranged to be spaced apart from each other at intervals along the front and rear direction of the vehicle; and a center floor arch reinforcement having both ends which each penetrate the side sill inner reinforcement to be bonded to the side sill outer reinforcement, connecting the plurality of center floor cross members spaced apart from each other, and transferring a shock force input from the side of the vehicle to the center floor cross members adjacent to each other to disperse the shock force.

The side sill inner reinforcement is formed with through holes through which ends of the center floor arch reinforcement respectively penetrate.

The center floor arch reinforcement includes a center portion formed to be rounded inward in the width direction of the vehicle and is configured to connect center floor cross members of the plurality of center floor cross members installed to be spaced apart from each other along the front and rear direction of the vehicle.

The center floor arch reinforcement has a cross section formed in an inverted U shape, and an opened lower end thereof is bonded to the center floor panel.

According to the side rigidity reinforcement structure of the vehicle according to the present disclosure having the above configuration, the side arch reinforcement may prevent the side sill from being rotated and entering into the vehicle upon side collision of the vehicle, thereby reducing the deformation of the vehicle body to reduce the passenger's injury.

In addition, it is possible to transfer the shock force to the center cross member through the center floor arch reinforcement through the side arch reinforce, thereby dispersing the shock force.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a side rigidity reinforcement structure of a vehicle according to exemplary forms of the present disclosure will be described in detail with reference to the accompanying drawings.

In one form, a side rigidity reinforcement structure of a vehicle includes: a side sill 10 that is extended in a front and rear direction of the vehicle and includes a side sill inner reinforcement 11 and a side sill outer reinforcement 12 which are bonded to each other; a first center floor cross member 42 disposed in a width direction of the vehicle and bonded to the upper surface of the center floor panel 41; a side arch reinforcement 51 that is formed to be convex upward to have the center portion spaced apart from the center floor panel 41 and has one end which penetrates the side sill inner reinforcement 11 so that the side sill outer reinforcement 12 is bonded to the inner lower surface to support the side sill inner reinforcement 11, and the other end connected to the first center floor cross member 42 to transfer a shock force input from the side sill outer reinforcement 12 to the center floor cross member 42, and a center floor arch reinforcement 52 in contact with the upper surface of the center floor panel 41.

The side sill 10 is disposed on the lower portion of the vehicle in the front and rear direction of the vehicle. The side sill 10 includes the side sill inner reinforcement 11 and the side sill outer reinforcement 12 having the cross sections formed to be curved in a predetermined shape in order to reinforce the rigidity of the side sill 10 inside the side sill outer panel 13.

The center pillar 20 is formed to connect a roof side 31 from the side sill 10. The center pillar 20 has the center pillar inner 21 and the center pillar outer 22, which have the cross sections formed in a predetermined shape, bonded to each other to connect the side sill 10 with the roof at the side of the vehicle so that a vehicle body has rigidity.

The center floor panel 41 forms an inner floor of the interior of the vehicle, and both ends thereof are in contact with the side sill 10.

Figure 6:
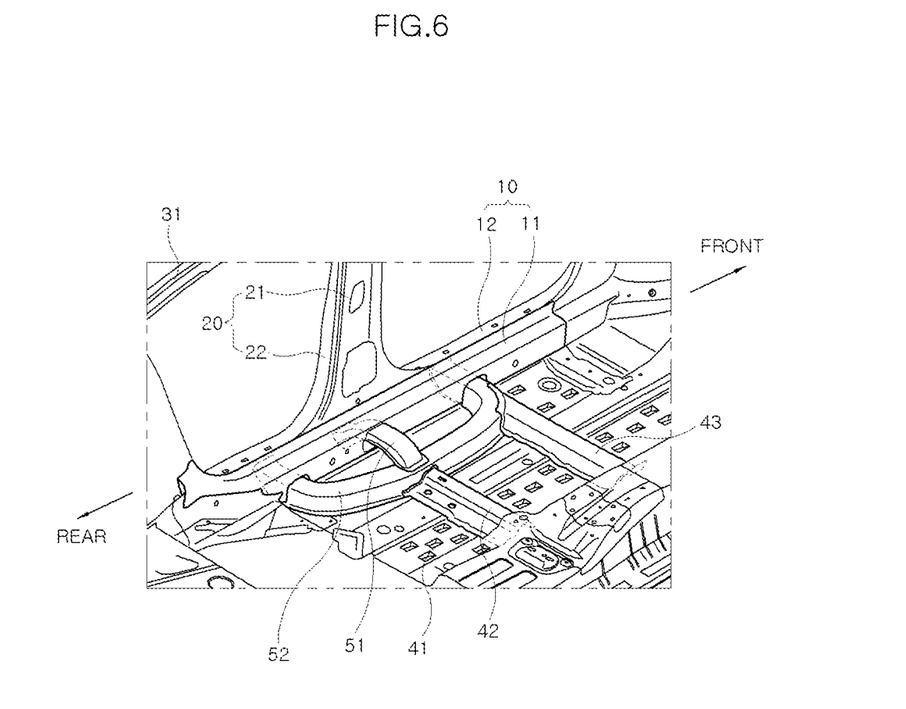
FIG. 6 is a perspective diagram illustrating a side rigidity reinforcement structure of a vehicle according to one form of the present disclosure.
Figure 7:
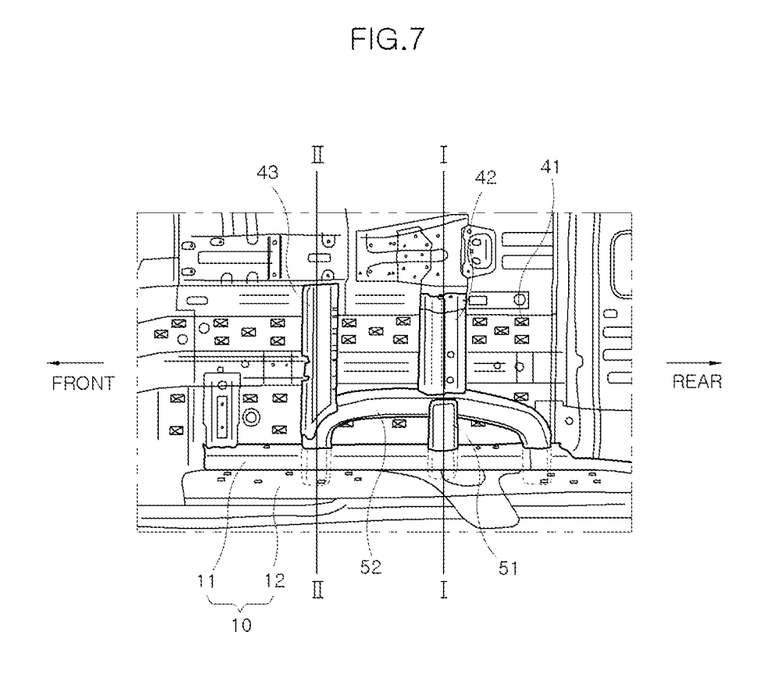
FIG. 7 is a plan diagram illustrating the side rigidity reinforcement structure of the vehicle according to one form of the present disclosure.
Figure 8A:
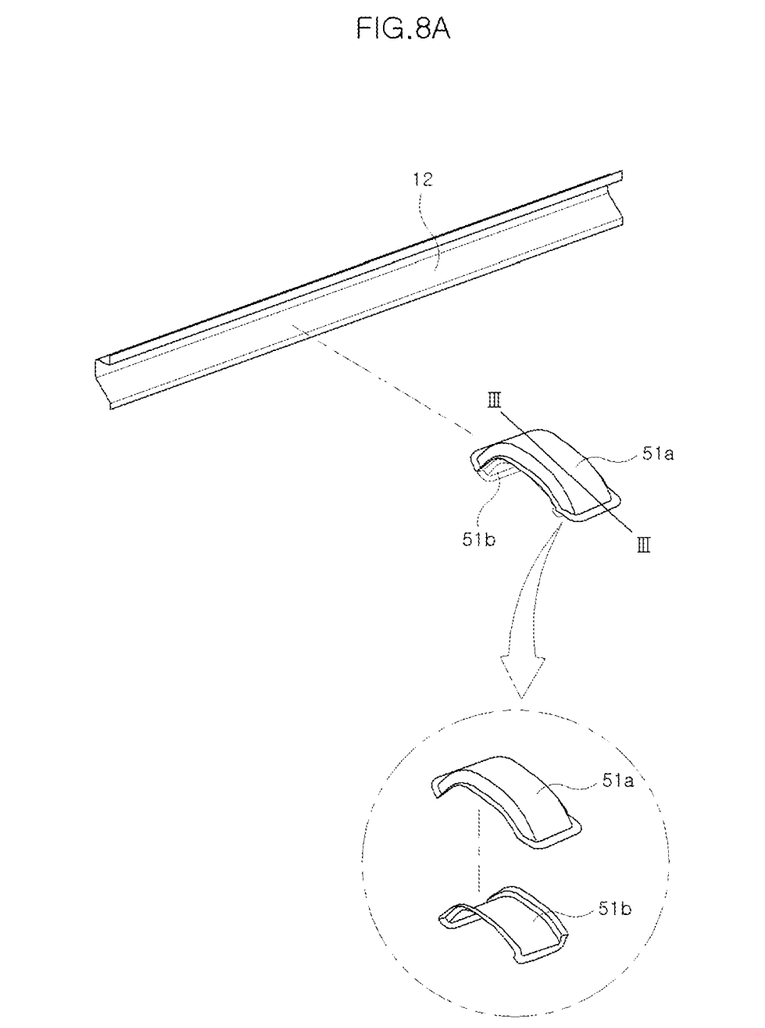
FIG. 8A is an exploded perspective diagram illustrating a bonding relationship between a side sill outer reinforcement, a side arch upper reinforcement, and a side arch lower reinforcement in the side rigidity reinforcement structure of the vehicle according to one form of the present disclosure.
Figure 8B:
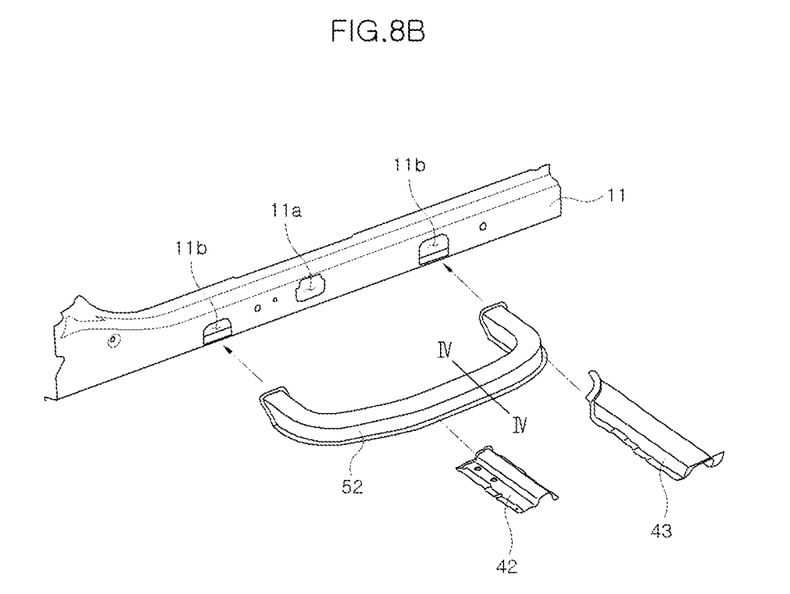
FIG. 8B is an exploded perspective diagram illustrating a bonding relationship between a side sill inner reinforcement, a center floor arch reinforcement, and a center floor cross member in the side rigidity reinforcement structure of the vehicle according to one form of the present disclosure.
Figure 9A:
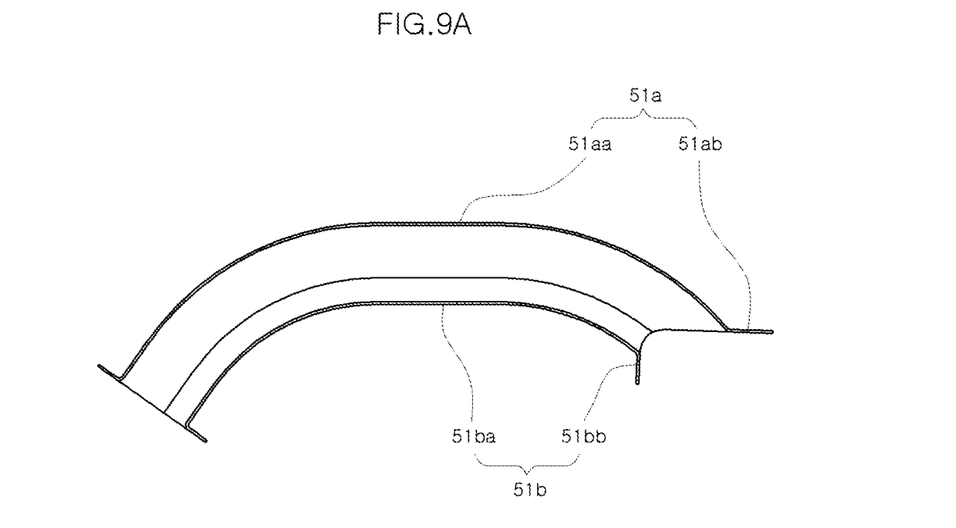
FIG. 9A is a cross-sectional diagram taken along the line illustrated in FIG. 8A.
Figure 9B:
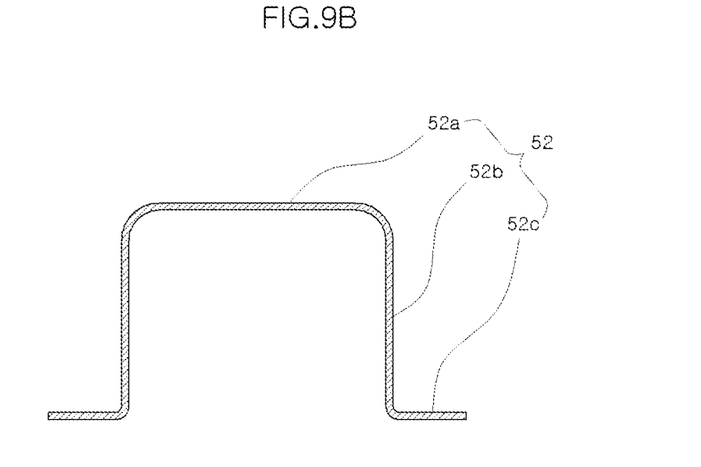
FIG. 9B is a cross-sectional diagram taken along the line IV-IV illustrated in FIG. 8B.

The center floor panel 41 is provided with a plurality of center floor cross members 42, 43 arranged in the width direction of the vehicle. The center floor cross members 42, 43 are bonded to the upper surface of the center floor panel 41 to give rigidity to the center floor panel 41 to be a structure. A plurality of center floor cross members 42, 43 are arranged along the front and rear direction of the vehicle. For example, FIG. 6 illustrates an example in which a second center floor cross member 43 is arranged in front of the first center floor cross member 42. Normally, the center floor panel 41 has the end in contact with the side sill 10 side, but in the present disclosure, the side sill 10 and the center floor cross members 42, 43 are connected to each other through the side arch reinforcement 51 and the center floor arch reinforcement 52 to be described later.

The side arch reinforcement 51 is formed to be convex upward so that the center portion is spaced apart from the center floor panel 41, and has both ends bonded to the side sill 10 and the first center floor cross member 42, respectively. The end of the first center floor cross member 42 is spaced apart from the side sill inner reinforcement 11 at a predetermined distance so that both ends of the side arch reinforcement 51 are bonded to the side sill outer reinforcement 12 of the side sill 10 and the first center floor cross member 42.

The side arch reinforcement 51 is located in a portion connected to the center pillar 20 in the side sill 10, thereby reinforcing the rigidity of a portion at which the side sill 10 and the center pillar 20 are bonded upon the side collision of the vehicle.

The side arch reinforcement 51 is formed to connect the first center floor cross member 42 from the side sill outer reinforcement 12, thereby forming a load path which transfers the shock force input to the side sill 10 by the side collision to the first center floor cross member 42.

The side arch reinforcement 51 may be formed by bonding a side arch upper reinforcement 51*a* and a side arch lower reinforcement 51*b* located below the side arch upper reinforcement 51*a*.

The side arch upper reinforcement 51*a* is formed to be convex upward, has one end bonded to the inner surface of the side sill outer reinforcement 12, and the other end bonded to an upper surface 52*a* of the center floor arch reinforcement 52 so as be connected to the first center floor cross member 42. The side arch upper reinforcement 51*a* includes a body 51*aa* formed in an arch shape, and a flange portion 51*ab* bonded to the side sill outer reinforcement 12, the side arch lower reinforcement 51*b*, and the center floor arch reinforcement 52 along the circumference of the body 51*aa*. The flange portion 51*ab* of the side arch upper reinforcement 51*a* is bonded to the upper surface 52*a* of the center floor arch reinforcement 52. The side sill inner reinforcement 11 is formed with a first through hole 11*a* through which the side arch upper reinforcement 51*a* penetrates so that the side arch upper reinforcement 51*a* may penetrate the side sill inner reinforcement 11 to be bonded to the side sill inner reinforcement 11.

The side arch lower reinforcement 51*b* is formed to be convex upward, and is located below the side arch upper reinforcement 51*a* to be bonded to the side arch upper reinforcement 51*a*. The side arch lower reinforcement 51*b* also has a body 51*ba* formed in an arch shape, and a flange portion 51*bb* bonded to the side sill outer reinforcement 12, the side sill arch upper reinforcement 51*a*, and the center floor arch reinforcement 52 along the circumference of the body 51*ba*. The flange portion 51*bb* of the side arch lower reinforcement 51*b* is bonded to a side surface portion 52*b* of the center floor arch reinforcement 52.

The side arch upper reinforcement 51*a* and the side arch lower reinforcement 51*b* are bonded to each other to form the cross section of the side arch reinforcement 51 in a box shape or a pipe shape, thereby exerting rigidity.

In one form, the side arch upper reinforcement 51*a* and the side arch lower reinforcement 51*b* are bonded to each other substantially perpendicular to the inner surface of the side sill outer reinforcement 12, that is, in the normal direction with respect to the inner lower surface of the side sill outer reinforcement 12. Accordingly, the side arch reinforcement 51 supports the side sill 10 in a direction perpendicular to a direction to be rotated by the shock force caused by the side collision, that is, in a normal direction to stop the rotation of the side sill 10. By stopping the rotation of the side sill 10 upon the side collision, it is possible to prevent the portion at which the side sill 10 and the center pillar 20 are in contact with each other from entering into the vehicle.

In another form, the side arch reinforcement 51 is formed in a box shape or a pipe shape having a closed cross-section in which the side arch upper reinforcement 51*a* and the side arch lower reinforcement 51*b* are bonded to each other to transfer the shock force input from the inner side surface of the side sill outer reinforcement 12 to the center floor cross members 42, 43.

However, if a battery needs to be mounted on the center floor panel 41 in an electric vehicle, a hybrid vehicle, or the like, only the side arch upper reinforcement 51*a* may be applied solely.

The center floor arch reinforcement 52 is further provided, so that the shock force input to the side of the vehicle is dispersed and transferred to the inside.

The center floor arch reinforcement 52 is formed to have one end which is in contact with the side sill 10 in front of a portion at which the side sill 10 and the side arch lower reinforcement 51*b* are bonded, and passes through a portion at which the side arch lower reinforcement 51*b* and the first center floor cross member 42 are in contact with each other, and to have the other end which is in contact with the side sill 10 behind the portion at which the side sill 10 and the side arch lower reinforcement 51*b* are in contact with each other, and in contact with the upper surface of the center floor panel 41.

The center floor arch reinforcement 52 has both ends bonded to the side sill outer reinforcement 12 of the side sill 10 and portions adjacent thereto which are formed in the width direction of the vehicle, and the remaining portions which are formed in a round shape so as to be convex into the vehicle. The center floor arch reinforcement 52 is also bonded to the inner lower surface of the side sill outer reinforcement 12. Accordingly, the portions adjacent to both ends of the center floor arch reinforcement 52 serve to transfer the shock force input from the side sill 10 to the center floor cross members 42, 43, and the center portion formed in a round shape forms various load paths so the shock force is transferred in the front and rear direction of the vehicle, thereby dispersing the shock force. Conventionally, a simple load path which is sheared only in the width direction of the vehicle is formed, but a multi-load path is formed so that the shock force is transferred not only in the width direction of the vehicle but also in the front and rear direction by the center floor arch reinforcement 52.

The cross section of the center floor arch reinforcement 52 is formed in an inverted U-shape, the lower end thereof is formed to be open, and the lower end thereof is bonded to the center floor panel 41.

Reviewing the cross section of the center floor arch reinforcement 52, the center floor arch reinforcement 52 includes the upper surface 52a, the side surface portions 52b extending downward from both ends of the upper surface 52a toward the center floor panel 41, and a flange portion 52c formed to be bent at the lower end of the side surface portion 52b to be in contact with the center floor panel 41.

The side sill inner reinforcement 11 is formed with a second through hole 11b through which the center floor arch reinforcement 52 penetrates so that the center floor arch reinforcement 52 may penetrate the side sill inner reinforcement 11 to be bonded to the side sill inner reinforcement 11. Since both ends of the center floor arch reinforcement 52 are each bonded to the side sill inner reinforcement 11, two second through holes 11b are formed to be spaced apart from each other in the side sill inner reinforcement 11. In addition, the first through hole 11a is located between the second through holes 11b in the side sill inner reinforcement 11.

A method for manufacturing the side rigidity reinforcement structure of the vehicle according to the present disclosure will be described as follows.

Figure 10:
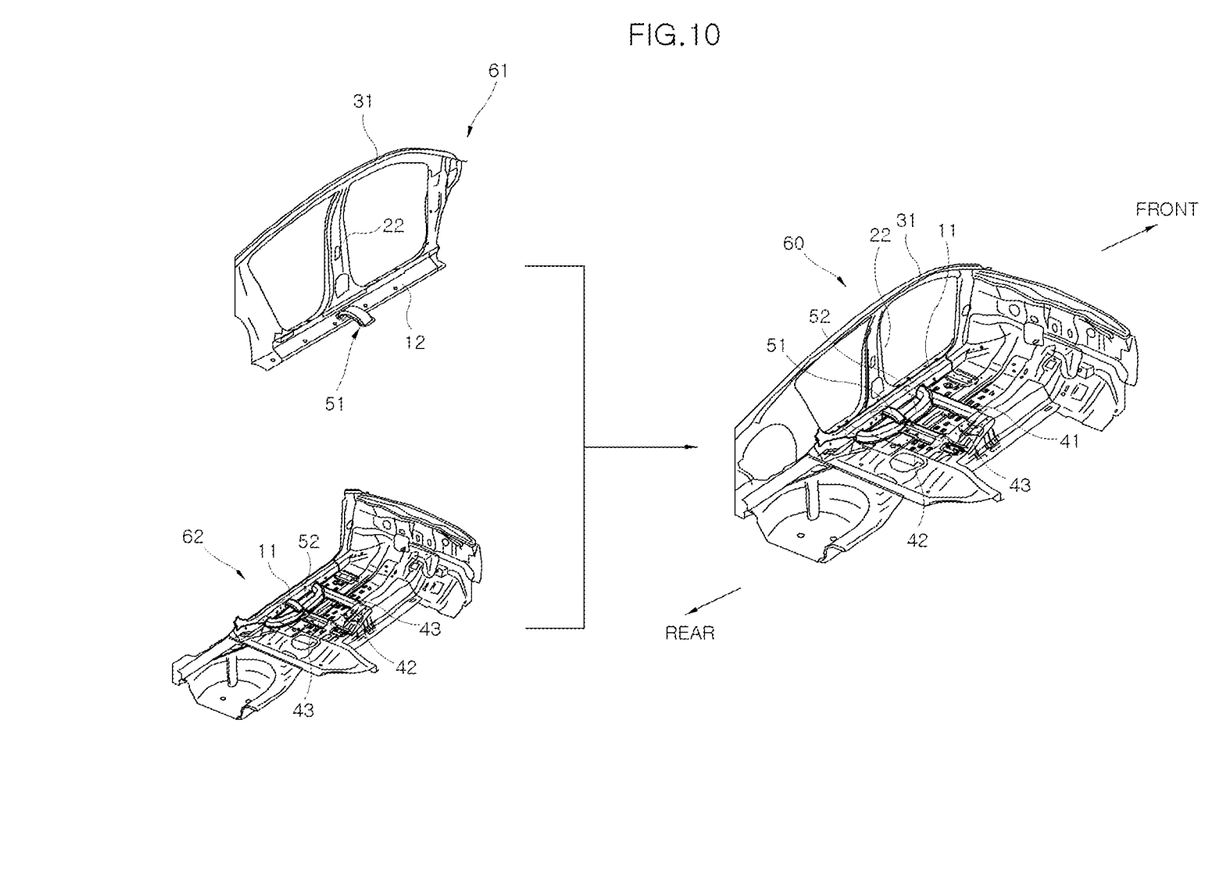
FIG. 10 is a schematic diagram illustrating a method for manufacturing the side rigidity reinforcement structure of the vehicle according to one form of the present disclosure.
Figure 11:
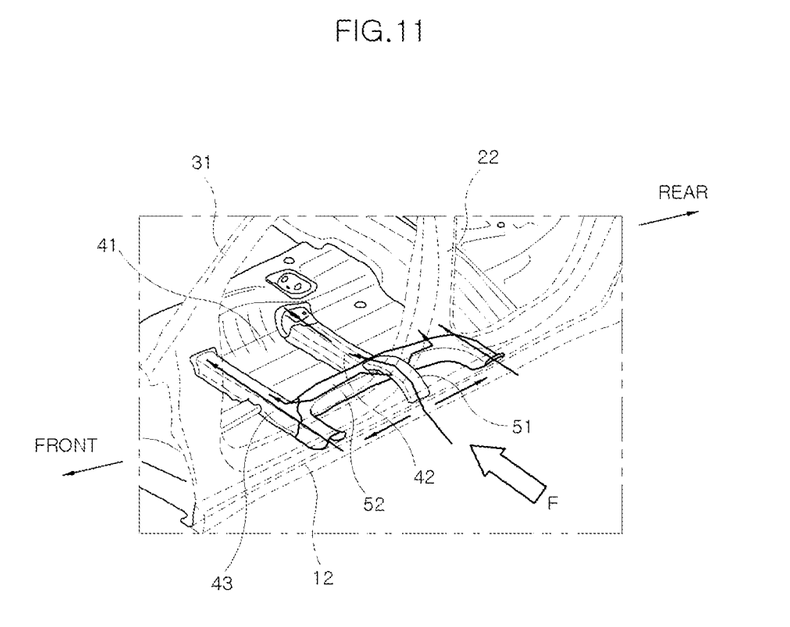
FIG. 11 is a perspective diagram illustrating a load path upon side collision according to the side rigidity reinforcement structure of the vehicle according to one form of the present disclosure.

Assembling a side assembly assembles a side assembly 61 by bonding one end of the side arch reinforcement 51 formed in an arch shape to the side sill 10 of the vehicle.

The assembling of the side assembly assembles the side assembly of the vehicle by bonding a front pillar assembly, a center pillar assembly, a quarter panel assembly, a side sill outer reinforcement 12, and the like to form the side of the vehicle, and bonds one end of the side arch reinforcement 51 to the inside of the side sill outer reinforcement 12.

Since the flange portions 51ab, 51bb are formed at one end of the side arch reinforcement 51, the flange portions 51ab, 51bb are bonded to the side sill 10, particularly, the inner surface of the side sill outer reinforcement 12.

Assembling a floor assembly assembles a floor assembly 62 by bonding the center floor arch reinforcement 52 to the center floor panel 41 of the vehicle.

The floor assembly of the vehicle includes the center floor panel 41, and the side sill inner reinforcement 11 is bonded to both side ends of the center floor panel 41, respectively, and is configured to be additionally bonded to the center floor arch reinforcement 52. The floor assembly is configured through the assembling of the floor assembly.

At this time, the flange portion 52c formed on the lower portion of the center floor arch reinforcement 52 is bonded to the center floor panel 41 in a state where the both ends of the center floor arch reinforcement 52 each penetrate the plurality of second through holes 11b formed in the side sill inner reinforcement 11.

In addition, the center floor arch reinforcement 52 has the portions adjacent to both ends which are formed in the width of the vehicle, and the center portion of the center floor arch reinforcement 52 which is formed in a round shape toward the inside of the vehicle, so that the ends of the center floor cross members 42, 43 are in contact with the portion formed in the width direction of the vehicle and the portions formed in a round shape.

Meanwhile, in the assembling of the side assembly and the assembling of the floor assembly, the assembling of the floor assembly may also be performed prior to the assembling of the side assembly.

Assembling a BIW assembles a body in white (BIW) 60 by assembling the side assembly 61 and the floor assembly 62. In order to bond the side assembly 61 and the floor assembly 62 in the assembling of the BIW assembly, first, the other end of the side arch reinforcement 51 penetrates the first through hole 11a formed in the side sill inner reinforcement 11.

Thereafter, the side assembly 61 and the floor assembly 62 are bonded to make the side assembly 61 and the floor assembly 62 integral. That is, the other end of the side arch reinforcement 51 is bonded to the upper surface 52a and the side surface portion 52b of the center floor arch reinforcement 52 while bonding the circumference of the side assembly 61 and the circumference of the floor assembly 62, and both ends of the center floor arch reinforcement 52 are bonded to the inside of the side sill outer reinforcement 13, so that the side assembly 61 and the floor assembly 62 are bonded.

FIG. 10 illustrates a load path through which the shock force is transferred upon side collision.

When the shock force is input to the side of the vehicle due to the side collision, the shock force is transferred to the side arch reinforcement 51 through the side sill 10. The shock force transferred to the side arch reinforcement 51 is not only transferred to the inside of the vehicle through the second center floor cross member 43, but also in the front and rear direction of the vehicle through the center floor arch reinforcement 52. The shock force transferred from the side arch reinforcement 51 to the center floor arch reinforcement 52 is transferred to the inside of the vehicle through the center floor cross members 42, 43.

In addition, the shock force is transferred in the front and rear direction of the vehicle through the side sill 10, and then is also input to the center floor arch reinforcement 52. The shock force input to the center floor arch reinforcement 52 is transferred to the inside of the vehicle through the center floor cross members 42, 43.

Figure 12:
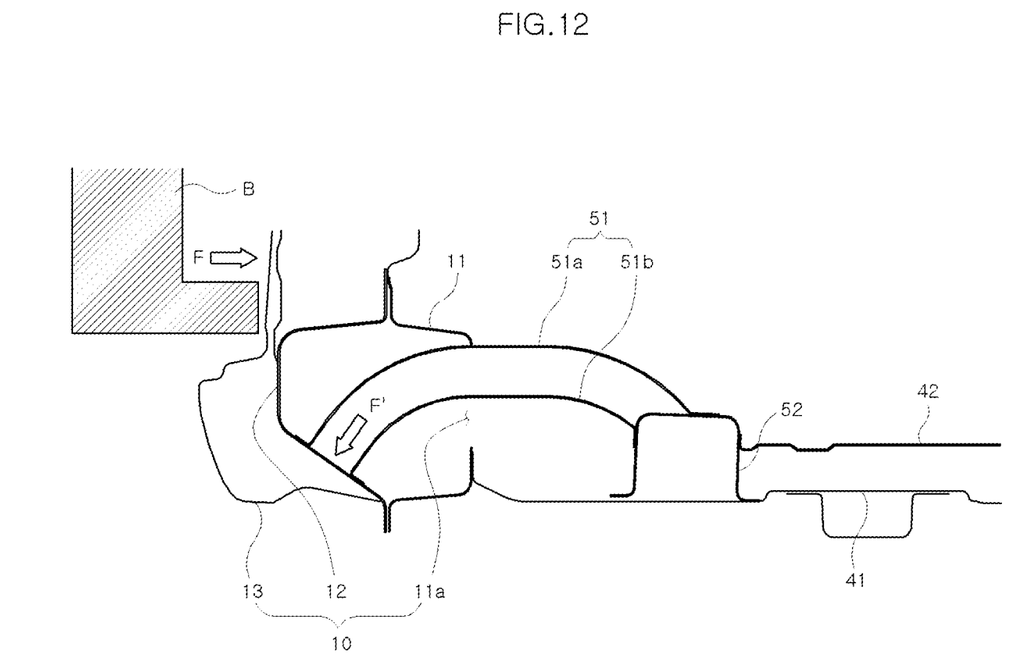
FIG. 12 is a cross-sectional diagram illustrating a load transfer process in the cross section taken along the line I-I illustrated in FIG. 7.

FIG. 12 illustrates a state where the shock force is input to the side sill 10, particularly, a portion where the side arch reinforcement 51 is formed. For example, when the barrier B for the collision test hits the side, the shock force is input to the side sill 10. At this time, the side arch reinforcement 51 generates a reaction force F' against the shock force F to rotate the portion at which the side sill 10 and the center pillar 20 are in contact with each other, thereby preventing the entry into the interior. Particularly, since the side arch reinforcement 51 contacts substantially perpendicular to the inner surface of the side sill outer reinforcement 12, the side sill 10 is supported in a direction of being rotated toward the interior and a normal direction, so that the portion at which the side sill 10 and the center pillar 20 are in contact with each other is rotated to prevent entry into the interior.

Figure 13:
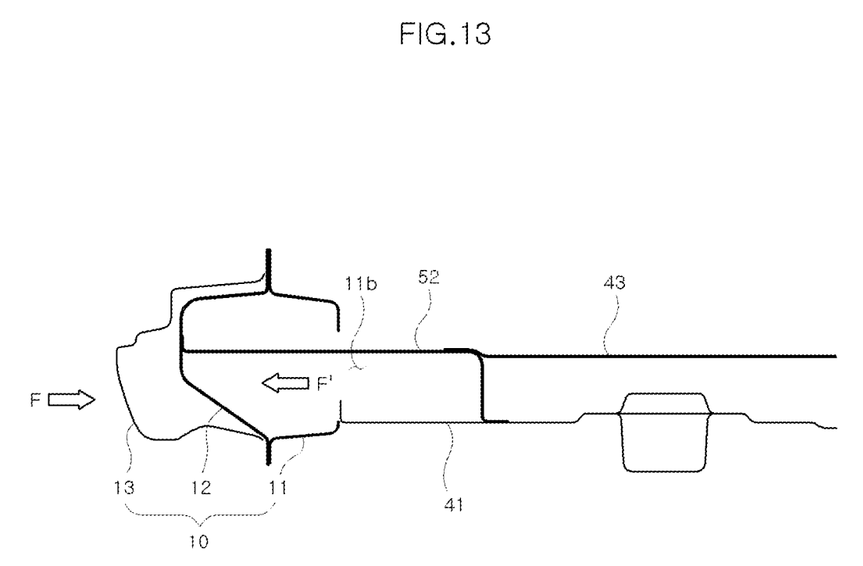
FIG. 13 is a cross-sectional diagram illustrating a load transfer process in the cross section taken along the line II-II illustrated in FIG. 7.

FIG. 13 illustrates a state where the shock force F is input through the center floor arch reinforcement 52.

The shock force F input through the side sill 10 is transferred to the center floor cross members 42, 43 through the center floor arch reinforcement 52, and the side sill 10 is supported by the reaction force F' of the center floor arch reinforcement 52, so that the portion at which the side sill 10 and the center pillar 20 are in contact with each other is rotated together with the side arch reinforcement 51, thereby preventing the entry into the interior.

What is claimed is:

1. A side rigidity reinforcement structure of a vehicle, comprising:
   a side sill extended in a front and rear direction of the vehicle and including a side sill inner reinforcement and a side sill outer reinforcement which are bonded to each other;
   a first center floor cross member disposed in a width direction of the vehicle and bonded to an upper surface of a center floor panel; and
   a side arch reinforcement formed to be convex upward and including a center portion spaced apart from the center floor panel, wherein the side arch reinforcement includes a first end connected to the side sill inner reinforcement, and a second end connected to the first center floor cross member so as to transfer a shock force input from the side sill outer reinforcement to the first center floor cross member,
   wherein the side sill inner reinforcement is formed with a first through hole through which the first end of the side arch reinforcement penetrates.

2. The side rigidity reinforcement structure of the vehicle of claim 1,
   wherein the first end of the side arch reinforcement is configured to penetrate the side sill inner reinforcement and fixedly attached on an inner lower surface of the side sill outer reinforcement to support the side sill inner reinforcement.

3. The side rigidity reinforcement structure of the vehicle of claim 1,
   wherein the side arch reinforcement is located at a portion of the side sill at which the side sill is connected to a center pillar of the vehicle.

4. The side rigidity reinforcement structure of the vehicle of claim 1, further comprising:
   a center floor arch reinforcement in contact with the upper surface of the center floor panel,
   wherein the center floor arch reinforcement includes:
      a first end bonded to the side sill outer reinforcement in front of a portion at which the side sill outer reinforcement and the side arch reinforcement are bonded to each other,
      a second end bonded to the side sill outer reinforcement behind the portion at which the side sill outer reinforcement and the side arch reinforcement are bonded to each other, and
      a center portion bonded to the side arch reinforcement and the first center floor cross member.

5. The side rigidity reinforcement structure of the vehicle of claim 4,
   wherein:
   the side sill inner reinforcement is formed with front and rear second through holes through which the first and second ends of the center floor arch reinforcement respectively penetrates, and
   a portion of the side sill inner reinforcement at which the side arch reinforcement penetrates is arranged between the front second through hole and the rear second through hole.

6. The side rigidity reinforcement structure of the vehicle of claim 4,
   wherein the side arch reinforcement comprises:
      a side arch upper reinforcement formed to be convex upward and including a first end boned to an inner surface of the side sill outer reinforcement and a second end connected to the first center floor cross member.

7. The side rigidity reinforcement structure of the vehicle of claim 4, further comprising:
   a second center floor cross member arranged in front of the first center floor cross member in the front and rear direction, wherein the second center floor cross member is bonded on the center floor panel and connected to the center floor arch reinforcement.

8. The side rigidity reinforcement structure of the vehicle of claim 1,
   wherein the side arch reinforcement comprises:
      a side arch upper reinforcement formed to be convex upward, and including: a first end boned to an inner surface of the side sill outer reinforcement, and a second end connected to the first center floor cross member; and
      a side arch lower reinforcement formed to be convex upward and located below the side arch upper reinforcement to be bonded to the side arch upper reinforcement.

9. A side rigidity reinforcement structure of a vehicle comprising:
   a side sill extended in a front and rear direction of the vehicle and including a side sill inner reinforcement and a side sill outer reinforcement which are bonded to each other;
   a center floor panel located in an interior of the vehicle, and having a side end bonded to the side sill;
   a plurality of center floor cross members extended in a width direction of the vehicle, bonded to an upper surface of the center floor panel, and arranged to be spaced apart from each other at intervals along the front and rear direction of the vehicle; and
   a center floor arch reinforcement having first and second ends configured to respectively penetrate the side sill inner reinforcement to be bonded to the side sill outer reinforcement, and configured to: connect center floor cross members of the plurality of center floor cross members and transfer a shock force input from a side of the vehicle to the center floor cross members.

10. The side rigidity reinforcement structure of the vehicle of claim 9,
    wherein the side sill inner reinforcement is formed with through holes through which the first and second ends of the center floor arch reinforcement respectively penetrate.

11. The side rigidity reinforcement structure of the vehicle of claim 9,
    wherein the center floor arch reinforcement includes a center portion formed to be rounded inward in the width direction of the vehicle and is configured to connect the center floor cross members installed to be spaced apart from each other along the front and rear direction of the vehicle.

12. The side rigidity reinforcement structure of the vehicle of claim 9,
    wherein the center floor arch reinforcement has a cross section formed in an inverted U shape, and an opened lower end thereof is bonded to the center floor panel.

* * * * *